July 12, 1927.
P. W. NEVILL
1,635,950
PROCESS FOR THE MANUFACTURE OF SPONGE IRON
Filed Nov. 21, 1925
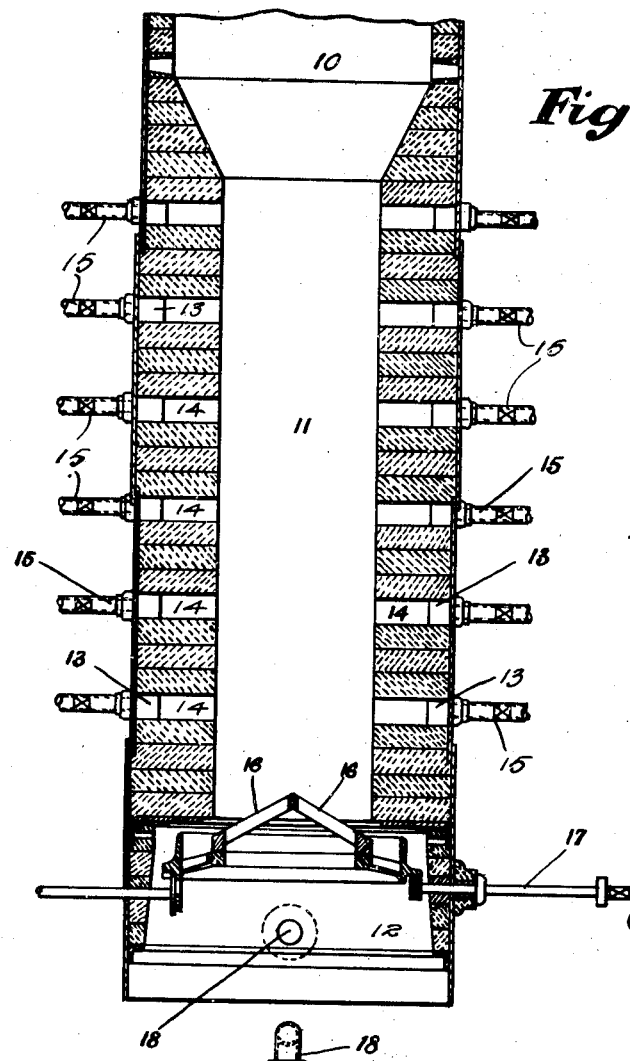
Fig:1.
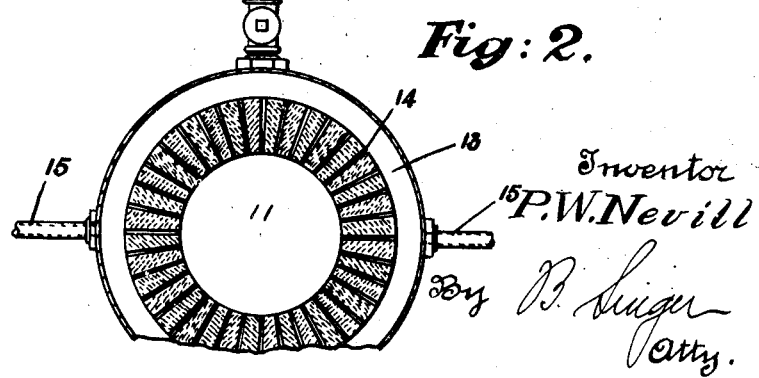
Fig:2.
Inventor
P. W. Nevill
By B. Singer
Atty.

Patented July 12, 1927.

1,635,950

UNITED STATES PATENT OFFICE.

PHILLIP WILLIAM NEVILL, OF PERTH, WESTERN AUSTRALIA, AUSTRALIA.

PROCESS FOR THE MANUFACTURE OF SPONGE IRON.

Application filed November 21, 1925, Serial No. 70,639, and in Australia December 1, 1924.

This invention relates to a process for the manufacture of sponge iron.

Many proposals have been made and/or tried for the manufacture of what is technically known as sponge iron.

There is the old Chinese method of reduction by heating a mixture of coarse ore and charcoal contained in fire clay pots. The disadvantage of such method is that it is impossible to obtain quantity production unless a large number of pots are employed.

Another method that has been proposed consists in rabbling a mixture of finely divided iron ore and carbonaceous material supported on a rotating hearth whilst being heated by radiation from the furnace roof. The disadvantage of such method is that the furnace is expensive to manufacture and that a large amount of fuel is required for heating, by reason of the comparatively inefficient transmission through the roof of the furnace.

Still another method consists in externally heating a rotating iron or steel cylinder containing a mixture of finely divided iron ore and carbonaceous material. The disadvantage of this latter method is that at the temperature of reduction scaling of the iron cylinder is very appreciable, whilst if the temperature rises a few hundred degrees, the cylinder will be rapidly ruined.

The process forming the present invention comprises passing coarse iron ore and carbonaceous fuel through a shaft furnace to which air is supplied at a plurality of places so as to result in the production of reducing gases at a temperature sufficiently high to cause reduction but not fusion, or at any rate only partial fusion, the process being further characterized in that fluxes are absent. An apparatus that is suitable comprises a shaft furnace, having a plurality of air admission ports at varying levels, so that there is a relatively deep zone of reduction without excessive localized heating at any part thereof.

To enable the invention to be more readily understood reference is now made to the accompanying drawings showing a suitable apparatus.

In these drawings Fig. 1 indicates a sectional elevation of such apparatus, and Fig. 2 a sectional plan thereof (exclusive of the grate). A shaft furnace suitably lined with refractory material or with water jackets has an upper zone 10, a reaction zone 11, and an ash pit 12 (preferably water sealed). In Fig. 1 the upper zone is shown cut off, but it will be continued to the desired height, to which further reference will subsequently be made.

At different levels in the reaction zone are a number of air admission zones. These air admission zones comprise air chambers 13, in juxtaposition to which the refractory bricks or the like are spaced so as to give a large number of air ducts 14 leading into the reaction zone. Each air chamber 13 is connected to one or more conduits 15 for the regulated admission of air. Intermediate the reaction zone and the ash pit is provided a grate for supporting the charge. Such grate is preferably mechanically operated and has the grate bars so spaced that continuous discharge of reduced material can be effected (including the larger lumps thereof). In the grate illustrated in Fig. 1 the grate is built up as a cone of bars 16, which are rotated by conventional mechanism driven by an external shaft 17. Any suitable means (not shown) will be attached to the upper part of the furnace for feeding purposes, where also provision will preferably be made for the escape of a small proportion of the gas that is generated in the furnace. Most of the gas formed will be led away through the conduit 18 communicating with the ash pit.

I will now describe a practical operation of the process carried out by me in the furnace. The reaction zone 11 was eight (8) feet high, and the upper zone 10 three (3) feet high. A mixture of coarse iron ore and charcoal was periodically charged into the furnace in equal proportions. The iron ore (mainly ferric oxide) was of varying sizes from about 3" diameter to about 1/16 inch diameter. Through the air ducts 14 was forced a regulated quantity of air so as to produce the desired reducing gases and the temperature required. As a result the reaction zone contained a downwardly moving column of iron ore and charcoal, whereby the ore was subjected to the influence of reducing gases (principally carbon monoxide) which penetrated and reduced most of the iron oxide to the metallic condition. Fusion did not take place, partly because a flux was absent, partly because the temperature was kept too low, and also partly because reduction was not highly localized, but was spread through an extensive zone.

The mechanically operated grate was adjusted so as to discharge the material at a rate that allowed sufficient time in the reaction zone to result in efficient reduction. The material that discharged through the grate fell into water at the bottom of the ash pit 12, whereby re-oxidation was effectually prevented. The reduced material was in a finer state of sub-division than the ore charged, and contained a high proportion of metallic iron. I had no difficulty in obtaining a product containing 60% of metallic iron when charging an iron ore containing 54% of iron calculated as metal. The material discharged contained some unconsumed charcoal, a condition regarded as desirable, for otherwise the upper portion of the reaction zone might be functioning to reduce the oxides of iron, whilst the lower portion might be effecting re-oxidation.

The removal of unconsumed charcoal can, if necessary, be effected in various ways. I have made use of the fact that when the discharged material drops into the water, the large pieces of charcoal float for a few seconds and can in consequence be mechanically raked off the surface and re-used. The product remaining comprises coarse and fine reduced iron and fine charcoal. On crushing such mixture and passing it over a concentrating table such as a Wilfley table, the iron readily separates from the fine charcoal, which can be used as a powdered fuel. As another alternative, magnetic concentration can be employed for cleaning the iron. The cleaned product is in an eminently suitable condition for copper precipitation or may be worked up into homogeneous iron.

In carrying out the process large volumes of gas are liberated, such gases being rich in carbon monoxide. The furnace therefore functions as a gas producer, so that my process really consists in passing iron ore through a furnace functioning as a gas producer. If the material is not in the reaction zone for a sufficient length of time, the reduction will not be reasonably complete, whilst if the temperature is too high, fusion will take place, which will be unsatisfactory as it will tend to protect the interior of the lumps of ironstone against permeation of reducing gases. Temperatures of from 800° to 1200° C. have been used. As a minimum a temperature not markedly below 900° C. is practically essential, because at and above such temperature the proportion of carbon dioxide formed is so small as to be incapable of having a material influence as an oxidizing agent. I have found a satisfactory working temperature to be one ranging from 900° to 1000° C. Partial fusion in the reaction zone will not be detrimental, provided reduction has already been effected.

The furnace used serves the dual purposes of reducing the iron ore and of making gas, of which the latter can be increased by adding a greater proportion of fuel and passing in a correspondingly increased amount of air.

Although charcoal has been described, it is of course but one of several suitable fuels. In its place I can use coke, and by having the upper portion 10 of the furnace sufficiently long, coal and even wood. In the case of coal and wood the first effect on these fuels is that they are coked or converted into charcoal in the upper portion 10 of the furnace.

The furnace described shows a large number of air admission ducts supplied with air, an arrangement that is of utility but is not essential to obtain a useful result by my process. Thus I have obtained some degree of reduction by admitting air at the top of the furnace and drawing it by suction through the charge. Nor must the furnace necessarily be provided with a water sealed ash pit, although such is the simplest arrangement that can be employed. Nevertheless, the ash pit could communicate with a conveyor suitably externally cooled for leading away and cooling the iron out of contact with air.

It is unnecessary to have a mechanically operated grate, or in fact to have a grate at all, but in working my process the combination of a grate and a water seal supplies a definite position to work for completion of a satisfactory degree of reduction and allows immediate cooling of the product, which is thereby effectually guarded against re-oxidation.

In manufacturing sponge iron according to this invention, the skilled operator must of course have regard to the circumstances peculiar to his ironstone, fuel, and to the extent of the demand for the gases produced. Thus, the density or permeability of his ironstone will determine the most economical size of material to be charged.

In this specification sponge iron means metallic iron in which the particles are separated from each other and do not form a homogeneous mass, in consequence of which the lumps of the reduced material can be crushed to a fine state of division without difficulty.

Iron ore means lumps of iron oxides (such as magnetite, hæmatite and limonite) or iron carbonates, and includes a roasted product.

I claim:—

1. A process for the manufacture of sponge iron by reducing the oxides to metal without fusion, consisting in passing iron ore and carbonaceous fuel without flux through a shaft furnace and supplying air at a plurality of places, whereby reduction extends over a considerable zone so that excessive localized heating is avoided.

2. A process for the manufacture of sponge iron by reducing the oxides to metal without fusion, consisting in passing iron ore and carbonaceous fuel without flux through a shaft furnace, supplying air at a plurality of places, removing the reduced material from the reducing zone, and preventing re-oxidation by causing it to drop into water.

Dated this 12th day of October, 1925.

PHILLIP WILLIAM NEVILL.